US009403128B2

(12) United States Patent
O'Brien et al.

(10) Patent No.: US 9,403,128 B2
(45) Date of Patent: Aug. 2, 2016

(54) NANOENGINEERED FIELD INDUCED CHARGE SEPARATION MEMBRANES MANUFACTURE THEREOF

(71) Applicant: Lawrence Livermore National Security, LLC, Livermore, CA (US)

(72) Inventors: Kevin C. O'Brien, San Ramon, CA (US); Jeffery J. Haslam, Livermore, CA (US); William L. Bourcier, Livermore, CA (US); William Clary Floyd, III, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 14/185,053

(22) Filed: Feb. 20, 2014

(65) Prior Publication Data

US 2014/0166489 A1 Jun. 19, 2014

Related U.S. Application Data

(63) Continuation-in-part of application No. 12/630,758, filed on Dec. 3, 2009, now Pat. No. 8,696,882.

(51) Int. Cl.

| | |
|---|---|
| ***B01D 61/46*** | (2006.01) |
| ***B01D 69/02*** | (2006.01) |
| ***B01D 69/12*** | (2006.01) |
| ***B01D 71/44*** | (2006.01) |
| ***B01D 71/64*** | (2006.01) |
| ***B01D 67/00*** | (2006.01) |
| ***C02F 1/469*** | (2006.01) |
| ***B01D 61/48*** | (2006.01) |

(52) U.S. Cl.

CPC .............. *B01D 61/46* (2013.01); *B01D 61/485* (2013.01); *B01D 67/0006* (2013.01); *B01D 67/0034* (2013.01); *B01D 67/0037* (2013.01); *B01D 67/0079* (2013.01); *B01D 69/02* (2013.01); *B01D 69/125* (2013.01); *B01D 71/44* (2013.01); *B01D 71/64* (2013.01); *C02F 1/4695* (2013.01); *B01D 2323/345* (2013.01); *B01D 2325/02* (2013.01); *B01D 2325/14* (2013.01); *B01D 2325/16* (2013.01)

(58) Field of Classification Search

CPC ........ B01D 71/64; B01D 69/02; B01D 61/46; B01D 2325/02; B01D 2325/14; B01D 2325/16; C02F 1/4693

See application file for complete search history.

(56) References Cited

U.S. PATENT DOCUMENTS 3,734,897 A * 5/1973 Stoy .................. B01D 67/0079 210/500.25
3,784,457 A * 1/1974 Mizutani ................ B01D 61/44 204/529
4,355,116 A * 10/1982 Lee .......................... C08F 8/32 521/27
4,655,886 A 4/1987 Oda et al.
5,736,050 A 4/1998 Pasternak et al.
5,961,796 A 10/1999 Hitchens et al.
6,048,507 A * 4/2000 Amouzegar et al. ....... 423/179.5
6,221,248 B1 4/2001 Lin et al.
6,410,672 B1 6/2002 MacDonald et al.
6,596,838 B1 7/2003 Pinery et al.
8,696,882 B2 4/2014 O'Brien et al.
2002/0019448 A1 2/2002 Sugaya et al.
2002/0042451 A1 4/2002 Sugaya
2002/0053511 A1 5/2002 Sugaya et al.
2002/0079235 A1 6/2002 Molter et al.
2004/0055875 A1 3/2004 Siwy et al.
2004/0076865 A1* 4/2004 Breault ........................... 429/30
2004/0122117 A1 6/2004 Yamanaka et al.
2005/0238937 A1* 10/2005 Oren ...................... B01D 61/44 521/27
2005/0252857 A1 11/2005 Wilson et al.
2007/0020391 A1* 1/2007 O'Brien ............... B01D 53/228 427/248.1
2010/0084280 A1* 4/2010 Gilliam et al. ................ 205/555
2010/0160466 A1* 6/2010 Elabd et al. ..................... 521/27
2010/0247415 A1* 9/2010 Gottlieb .................. C01B 33/12 423/339
2011/0132762 A1 6/2011 O'Brien et al.
2012/0031834 A1* 2/2012 Higa ...................... B01D 61/44 210/500.42
2012/0035280 A1* 2/2012 Jikihara ................. B01D 61/44 521/27
2012/0312737 A1* 12/2012 Miller .................... B01D 71/10 210/500.25
2013/0146450 A1* 6/2013 Kishino ................. B01D 61/44 204/296
2013/0264209 A1* 10/2013 Kwon .................. C02F 1/4695 204/638

(Continued)

FOREIGN PATENT DOCUMENTS

EP 0645176 3/1995
EP 1712558 10/2006
GB 1437271 A * 5/1976 ............. B01D 61/44

(Continued)

OTHER PUBLICATIONS

"Electrodialysis" (Process Description). Ameridia. Jun. 17, 2008 capture of <http://www.ameridia.com/html/elep.html> using Wayback Machine Internet Archive.*

Guesmi, F., Hannachi, Ch., and Hamrouni, B. "Selectivity of anion exchange membrane modified with polyethyleneimine." Ionics. Oct. 5, 2011. vol. 18, Issue 7. pp. 711-717.*

Shaposhnik, V.A. a nd Kesore, K. "An early history of electrodialysis with permselective membranes." Journal of Membrane Science. Dec. 10, 1997. vol. 136, Issues 1-2. pp. 35-39.*

Sata, T.; Tanimoto, M.; Kawamura, K.; and Matsusaki, K. "Transport Properties of Cation Exchange Membranes in the Presence of Ether Compounds in Electrodialysis." Journal of Colloid and Interface Science. Nov. 15, 1999. vol. 219, Issue 2. pp. 310-319.*

Xu, Tongwen. "Review: Ion exchange membranes: State of their development and perspective." Journal of Membrane Science. Aug. 15, 2005. vol. 263, Issue 1. pp. 1-29.*

(Continued)

*Primary Examiner* — Steven A. Friday
(74) *Attorney, Agent, or Firm* — Zilka-Kotab

(57) ABSTRACT

A device according to one embodiment includes a porous membrane having a surface charge and pore configuration characterized by a double layer overlap effect being present in pores of the membrane, where the porous membrane includes functional groups that preferentially interact with either cations or anions. A device according to another embodiment includes a porous membrane having a surface charge in pores thereof sufficient to impart anion or cation selectivity in the pores. Additional devices, systems and methods are also presented.

16 Claims, 6 Drawing Sheets

(56) References Cited

U.S. PATENT DOCUMENTS

2013/0313187 A1* 11/2013 Yin ........................ B01D 61/44 210/500.33
2014/0319049 A1* 10/2014 Tang et al. .................... 210/489

FOREIGN PATENT DOCUMENTS

JP 2001040273 A * 2/2001
WO WO2007030202 3/2007
WO WO 2012045152 A1 * 4/2012 ............ B01D 61/44

OTHER PUBLICATIONS

Qu, C., Zhang, H., Zhang, F., and Liu, B. "A high-performance anion exchange membrane based on bi-guanidinium bridged polysilsesquioxane for alkaline fuel cell application." Journal of Materials Chemistry. Mar. 23, 2012. vol. 22, Issue 17. pp. 8203-8207.*

Xiao, H and Qian, Liying. "Water-soluble polymbers for Rendering Cellulose Fibres Antimicrobial: Guanidine-Based Polymers." (Section 4.1.1). Polymeric Materials with Antimicrobial Activity: From Synthesis to Applications. Nov. 13, 2013. pp. 76-78.*

Sphaero Q, "Poretics Polycarbonate (PCTE) Membrane Filters," Product Information Page, Last Accessed Oct. 2012 from website: www.shaero-q.com, pp. 1-5.

Tanaka, Y., "Water dissociation in ion-exchange membrane electrodialysis," Journal of Membrane Science, vol. 203, Issues 1-3, Jun. 30, 2002, pp. 227-244, abstract only.

Fleischer et al., "Nuclear tracks in solids: principles and applications," Citation Classic, No. 1, Feb. 1, 1982, p. 20.

Dorschel et al., "Measurement of the track etch rates along proton and alpha particle trajectories in CR-39 and calculation of the detection efficiency," Radiation Measurements, vol. 31, Issues 1-6, Jun. 1999, pp. 103-108.

Nino et al., "Positively charged surface potential of polymer films after excimer laser ablation: Application to selective-area electroless plating on the ablated films," Applied Physics Letters, vol. 60, Issue 21, May 25, 1992, abstract only.

Borrego et al., "Development and Application of New Positively Charged Filters for Recovery of Bacteriophages from Water," Applied and Environmental Microbiology, vol. 57, No. 4, Apr. 1991, p. 1218-1222.

Lytle et al., "Virus Passage through Track-Etch Membranes Modified by Salinity and a Nonionic Surfactant" Applied and Environmental Microbiology, Jun. 1999, p. 2773-2775.

Ferain et al., "Track-etch templates designed for micro-and nanofabrication," Nuclear Instruments and Methods in Physics Research Section B: Beam Interactions with Materials and Atoms, vol. 208, Aug. 2003, pp. 115-122, abstract only.

Virk et al., "Ion track filters: Properties, development and applications," Current Science, vol. 75, No. 8, Oct. 25, 1998, p. 765.

"Development of charge-mosaic membrane," http://piano.chem.yamaguchi-u.ac.jp/English/theme/mosa.htm, downloaded Dec. 2, 2009, pp. 1-2.

International Preliminary Report from PCT application No. PCT/US2010/054819 dated Jun. 14, 2012.

Non-Final Office Action from U.S. Appl. No. 12/630,758 dated Aug. 1, 2012.

Final Office Action from U.S. Appl. No. 12/630,758 dated Dec. 18, 2012.

Non-Final Office Action from U.S. Appl. No. 12/630,758 dated Jul. 2, 2013.

Notice of Allowance and Fee(s) Due from U.S. Appl. No. 12/630,758 dated Nov. 21, 2013.

Xanthos, M., "Funtional Fillers for Plastics," 2005 Wiley-VCH Verlag GmbH & Co., pp. 1-33.

DuPont Fuel Cells, "DuPont(TM) Nafion(R) PFSA Membranes," 2009, Retrieved on Jun. 20, 2013 from http://www2.dupont.com/FuelCells/en_US/assets/downloads/dfc101.pdf, pp. 1-4.

Valero et al., "Eelctrodialysis Technology—Theory and Applications," Desalination, Trends and Technologies, Feb. 28, 2011, InTech., pp. 3-20.

Bourcier et al., "FY05 LDRD Final Report Molecular Engineering of Electrodialysis Membranes 03-ERD-060," Mar. 1, 2006, Lawrence Livermore National Laboratory, pp. 1-22.

Shaposhnik et al., "An early history of electrodialysis with permselective membranes," Journal of Membrane Science, Dec. 10, 1997, vol. 136, Issue 1-2, pp. 35-39.

Lawrence Livermore National Laboratory, "Helping water managers ensure clean and reliable supplies," Science Technology Review, Jul. 12, 2004, Jul./Aug. 2004 Issue, pp. 4-13.

"Electrodialysis and Electrodialysis Reversal," Manual of Water Supply Practices M38, 1999, pp. 1-63.

* cited by examiner

NANOENGINEERED FIELD INDUCED CHARGE SEPARATION MEMBRANES MANUFACTURE THEREOF

RELATED APPLICATIONS

This is a continuation-in-part of U.S. application Ser. No. 12/630,758, filed Dec. 3, 2009, which is incorporated herein by reference and to which the benefit of priority is hereby claimed.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to materials separation technology, and more particularly to separations in aqueous and nonaqueous fluids using field induced charge separation membranes.

BACKGROUND

Reverse Osmosis (RO), nanofiltration, ultrafiltration, electrodialysis, and electrodeionization are just a few of the technologies that utilize membranes to purify water. One of the key drivers behind the economics of water purification is the amount of energy required to perform the separation. Decreasing the amount of energy required to perform the separation usually decreases the cost of water purification. As a result, there is a market need to decrease the amount of energy required to purity water.

Reverse osmosis, nanofiltration, and ultrafiltration are processes that use an applied pressure to remove impurities from water. In comparison, electrodialysis and electrodeionization processes use an electric field to remove impurities from water. A schematic of one type of standard electrodialysis (ED) process in shown in FIG. 1. A potential or voltage 110 is applied to two metal electrodes denoted as anode (+) 108 and cathode (−) 106 in FIG. 1. Stacks of alternating cation permeable membranes 104 and anion permeable membranes 102 are in between the electrodes. These membranes are typically made of ion exchange resins that only permit the passage of cations (cation permeable) or anions (anion permeable). An example of how the process works is shown in FIG. 2.

Referring to FIG. 2, in this example, water with a high salt content (e.g., NaCl) flows into the top of the assembly. As the water flows to the bottom, Na+ ions 212 and $Cl^-$ ions 210 are removed from the water. The purified water 214 flows out the bottom. Cations (Na+) 212 and anions ($Cl^-$) 210 are concentrated in one compartment (brine) 216, while product water is produced in the other compartment. A cathode 206 and an anode 208 are positioned on either side of an alternating series of cation selective permeable membranes 202 and anion selective permeable membranes 204. Cations and anions must diffuse from the input stream, through the membranes, and into the brine or product streams. This diffusion process is driven by the applied potential or voltage (V). The amount of cations or anions removed in a given amount of time relates to the current (I). The electrical resistance of the membrane can be defined as R. Using Ohm's Law, V/R=I. This implies that for a given applied voltage, the greater the electrical resistance of the membrane, the lower the current or amount of ions removed from the water per given time. These relationships imply that lowering the resistance of the membranes should increase the current or amount of ions removed per given time.

The electrodeionization (EDI) process very similar to the ED process. In this case, ion exchange resin beads are used to fill in the spaces between the membranes in FIGS. 1 and 2. The ion exchange resin beads assist in removing small traces of cations and anions that are present in the feed water. Cations and anions are still transported through the membranes and the Ohm's Law discussion described above is still valid.

In order for membranes to function properly in ED and EDI applications, they must be selective for either cations or anions. In other words, it is preferred that anion permeable membranes should enable only the transport of anions, while it is also preferred that cation membranes should enable only the transport of cations. For example, conductance of one cation for every 1000 anions in an anion permeable membrane may be acceptable in some approaches, particularly where the overall resistance is substantially lower as compared to traditional membranes. As a result, traditional ED and EDI membranes are nonporous meaning that there are no pores large enough to allow bulk flow of water and ions. Ion transport through these nonporous membranes tends to be slow. This is one of the reasons for the high electrical resistivity of traditional ED and EDI membranes.

ED and EDI membranes are commonly made from polymers that have poor mechanical properties. The types of polymers that transport ions also tend to have poor mechanical properties. The thickness of the membranes must be great enough to withstand factors such as packing stacks of the membranes and withstanding pressure differentials across the membranes.

Commercial ED and EDI membranes not only suffer from high electrical resistances, but also must be stored in special solutions (i.e., stored wet). The performance of these membranes decreases when they dry out. These membranes are continuous, i.e., they do not have pores and are relatively thick. These features slow the transport of ions across the membrane.

Prior art sources have focused on using advances in the chemistry of ion exchange resins to enhance the transport properties of membranes used in ED and EDI processes. Various functional groups have been added to the polymer chains of the ion exchange resins used to fabricate the membranes. These functional groups are reported to enhance the ability of the membrane to transport only cations, only anions, and/or only certain cations or anions. These types of improvements either alter the chemistry of the polymer backbone or alter side chains on the polymer. Also, asymmetric or composite membranes can be prepared. This approach, which has traditionally been used for gas separation membranes, was applied to ED and EDI membranes. It results in a thin dense layer (nonporous layer) on the top of a microporous backing. The procedure to form these asymmetric structures is complicated and requires casting from solvents and working with emulsions. It has been shown previously that residual solvent in asymmetric films influences the transport properties of the films. Transport of ions still relies on the same mechanisms described previously.

Charge-mosaic membranes and bipolar membranes attempt to increase the efficiency of separation processes by combining cation and anion selective membranes into a layered structure. These membranes are still based on traditional ion exchange resins and the transport of ions is very similar to previously described art. They are nonporous as are the layers containing functional groups on the polymers that drive the separation process.

Nanoporous structures have been discussed in the prior art for separation of charged macromolecules, e.g., DNA. These systems employ the use of ion-track etched polymers that have been coated with metals. A separate charge must be applied to the metalized polymer in order to create a surface charge. This system requires special asymmetric pores. In addition, a voltage is not only applied to the metalized polymer, it is also applied across the metalized membrane. This creates a very energy intensive and costly system due to the need to apply multiple voltages and the need to design specific asymmetric pores.

In order to reduce the energy required to purify water it would be desirable to decrease the thickness of the membrane. In addition, it would be desirable to transport the ions through the film using a mechanism different than the mechanism used in traditional nonporous films. It would also be beneficial to enhance the mechanical properties of the membrane. This would enable thinner membranes to be utilized. In addition, the operational and maintenance costs of separation systems could be decreased if membranes were not required to be stored in special solutions.

According to one embodiment, a device includes a porous membrane in a solution, where the porous membrane has a surface charge and pore configuration characterized by a double layer overlap effect being present in pores of the membrane, and where the porous membrane includes functional groups that preferentially interact with either cations or anions.

According to another embodiment, a deionization system includes a barrier; an anode coupled to the barrier; a cathode coupled to the barrier; at least one cation selective porous membrane solution positioned between the anode and cathode; and at least one anion selective porous membrane in a solution positioned between the anode and the cathode. The at least one cation selective porous membrane has a negative surface charge and pore configuration characterized by a double layer overlap effect being present in pores of the membrane. The at least one anion selective porous membrane has a positive surface charge and pore configuration characterized by a double layer overlap effect being present in pores of the membrane.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

Figure 6:
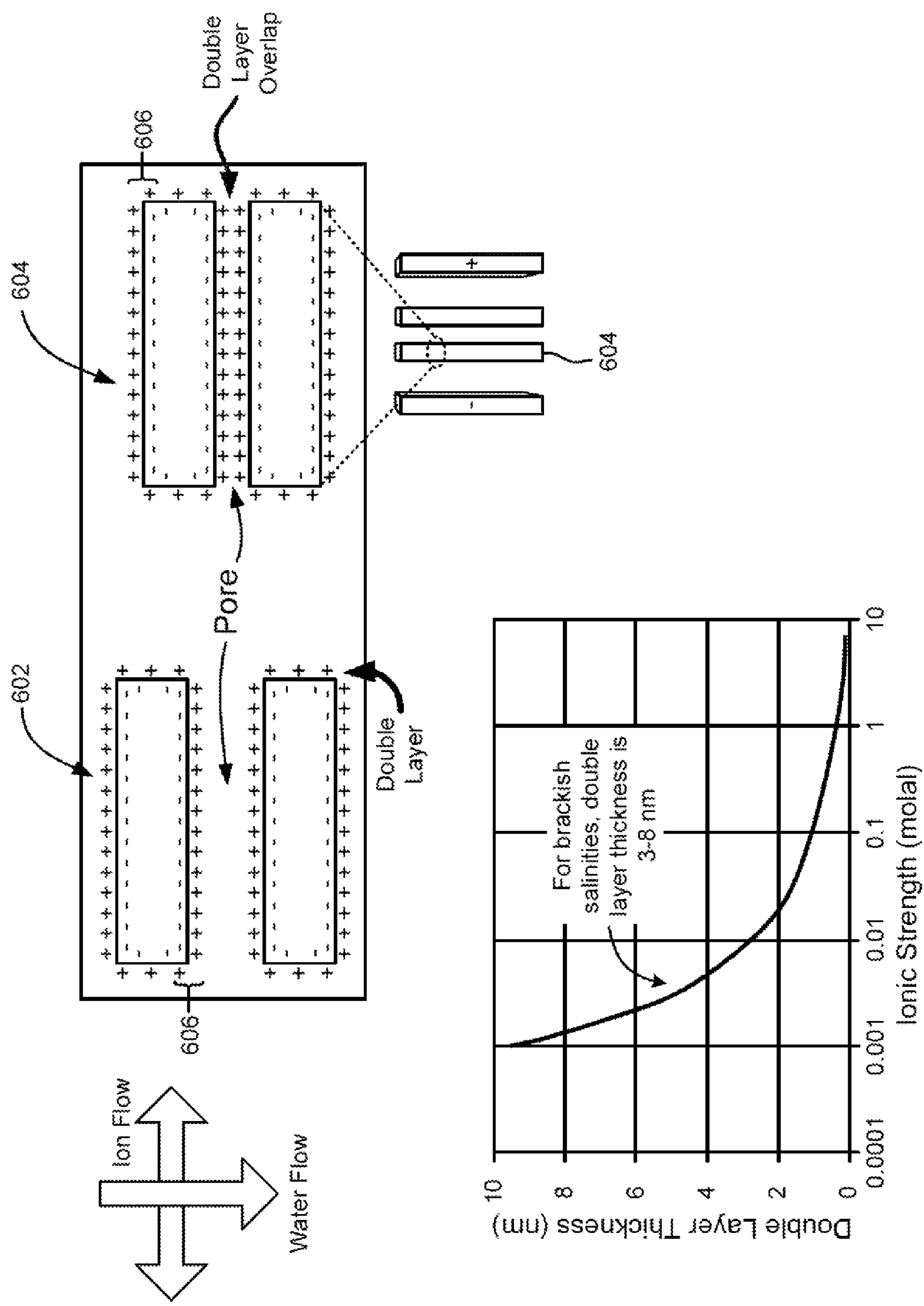
FIG. 6 shows that double layer effect according to one embodiment.

In one general embodiment, a device comprises a porous membrane having a surface charge and pore configuration characterized by a double layer overlap effect being present in pores of the membrane. The double layer overlap phenomenon is illustrated in FIG. 6. The effect is to limit or exclude the rate transport of ions of the opposite charge in solution.

In another general embodiment, a device comprises a porous membrane having a surface charge in pores thereof sufficient to impart anion or cation selectivity in the pores.

In yet another general embodiment, a device includes a porous membrane in a solution, where the porous membrane has a surface charge and pore configuration characterized by a double layer overlap effect being present in pores of the membrane, and where the porous membrane includes functional groups that preferentially interact with either cations or anions.

In still another general embodiment, a deionization system comprises a barrier; an anode coupled to the barrier; a cathode coupled to the barrier; and at least one of a cation selective porous membrane and an anion selective porous membrane positioned between the anode and the cathode, wherein the cation selective porous membrane, if present, has a negative surface charge and pore configuration characterized by a double layer overlap effect being present in pores of the membrane, wherein the anion selective porous membrane, if present, has a positive surface charge and pore configuration characterized by a double layer overlap effect being present in pores of the membrane.

In a further general embodiment, a deionization system includes a barrier; an anode coupled to the barrier; a cathode coupled to the barrier; at least one cation selective porous membrane solution positioned between the anode and cathode; and at least one anion selective porous membrane in a solution positioned between the anode and the cathode. The at least one cation selective porous membrane has a negative surface charge and pore configuration characterized by a double layer overlap effect being present in pores of the membrane. The at least one anion selective porous membrane has a positive surface charge and pore configuration characterized by a double layer overlap effect being present in pores of the membrane.

In an additional general embodiment, a method for separating ions from a fluid, comprising: setting a potential of an anode and a cathode; contacting a fluid with at least one of a cation selective porous membrane and an anion selective porous membrane positioned between the anode and the cathode, wherein the cation selective porous membrane, if present, has a negative surface charge and pore configuration characterized by permitting cations to pass through the pores thereof, wherein the anion selective porous membrane, if present, has a positive surface charge and pore configuration characterized by permitting anions to pass through the pores thereof.

In any of the approaches described herein, many membranes may be present, including hundreds or thousands of them. Moreover, in approaches having pairs of cation and anion selective membranes, multiple pairs may be present, including hundreds or thousands of pairs.

In some embodiments, Field Induced Charge Separation Membranes (FIC Membranes) offer the following advantages over traditional ED and EDI membranes:

1. Nanoporous membranes that transport ions due to a double layer overlap effect.
2. Built with materials known as have excellent mechanical properties, therefore are significantly thinner than conventional ED and EDI membranes.
3. Do not require storage in special solutions.
4. Surfaces can be nanoengineered to enable them to be selective for either anions or cations.
5. Require less energy per unit weight to purify water than conventional ED and EDI membranes.

The transport process for FIC membranes differs significantly from the transport of ions through conventional ED and EDI membranes. Conventional ED and EDI membranes rely on transport of ions through the continuous membrane, i.e., there are no pores present. Changes in the functional groups on the polymer used to fabricate the membrane enables the membrane to be either selective for anions or cations. In comparison, FIC membranes are selective for either cations or anions based on one or more of the following factors:

1. Surface Charge: The surface charge creates either a positively charged surface (attracts anions, therefore anion selective) or a negatively charged surface (attracts cations therefore cation selective).
2. Pore Size: In conjunction with the surface charge, the pore size may be small enough to enable the double layer overlap effects in the pores.
3. Pore density: If the pore size is the proper diameter, increasing the pore density will increase the amount of ions being transported through the membrane.
4. Functional Groups: The surface is functionalized with groups that preferentially interact with certain cations or anions. For example, placing quaternary amines on the surface creates a surface that preferentially attracts anions, especially nitrate ions.

The surface charge on the surface membrane is one of the factors that determines whether the membrane is selective for cations or anions. An inherently negatively charged surface results in a membrane that is more selective for cations, whereas a positively charged surface results in a membrane that is more selective for anions. In addition, other methods may be used, such as excimer laser ablation, to impart positive charges to polymeric films. Furthermore, functional groups, such as quaternary amines, can be added to the surface to further enhance the ability to remove either cations or anions from the solution.

The pores are preferably small, i.e., nanometer sized (e.g., between about 1 and about 500 nm, more preferably between about 1 and about 30 nm for ion separation; larger or smaller for other types of separations as will be understood by those skilled in the art apprised with the teachings herein), and are preferably as regular and uniform in size as possible. In some approaches, an average or mean diameter of the pores in the membrane(s) may be less than about 30 nm, alternatively between about 6 nm and about 16 nm, but could be higher or lower, such as 3 nm or 18 nm.

In some additional embodiments, a pore density of the membrane(s) may be about $1\times10^9$ pores/$cm^2$ or greater. However, the pore density of the membrane(s) may be lower in some embodiments, e.g., $1\times10^8$ pores/$cm^2$ or less.

One approach for forming a porous membrane includes ion tracking and subsequent etching of polymers. Ion tracking typically involves colliding a high energy ion with an upper/top surface of the polymer membrane. The high energy ion subsequently travels through the polymer membrane (e.g. in a general direction extending from the upper/top surface of the membrane to a lower/bottom surface of the membrane), thereby forming a path of damaged/disturbed polymer material. An etchant, such as a sodium hydroxide solution or other suitable basic solution known in the art, may then be applied to the polymer membrane to dissolve the damaged/disturbed polymer material, thereby forming a pore.

Another approach for forming a porous membrane includes neutron tracking and subsequent etching of polymers. In this approach, an atomic particle, including but not limited to a neutron, proton, etc., may be collided with an upper/top surface of the polymer membrane. Passage of the atomic particle through the polymer (e.g. in a direction from the upper/top surface of the polymer membrane to a lower/bottom surface of the membrane) may also generate a path of damaged/disturbed polymer material, which may be subsequently dissolved via application of an etchant.

As used herein, methods involving the tracking and subsequent etching of polymers may be generally referred to as "track etching." Moreover, as used herein, track etching methods involving tracking via ions or atomic particles may be referred to as "ion track etching" and "atomic particle track etching," respectively.

The atomic particle (e.g. neutron) and ion track etching methods mentioned above may produce relatively uniform pore diameters ranging from approximately 100 nm to less than about 10 nm, according to various approaches. Additionally, these methods may also be used to produce pores with various geometries (e.g. cylindrical, hexagonal, cubic, asymmetrical/irregular, etc.). Further, these atomic particle and ion track etching methods may also be used to produce pores with various orientations. For instance, in some approaches the path of the atomic particle or ion (and the subsequent etchant) through the polymer may be in a direction perpendicular or substantially perpendicular to the upper/top surface of the polymer, thereby forming pores that are oriented perpendicular or substantially perpendicular to the upper/top surface of the polymer. In other approaches, the path of the atomic particle or ion (and subsequent etchant) through the polymer may be at an angle (e.g. greater than 0° and less than 90°) relative to the normal to the upper/top surface of the polymer, thereby forming a pore oriented at said angle. In preferred approaches, the path of the atomic particle or ion (and the subsequent etchant) through the polymer may be straight or substantially straight, thereby forming pores that are linear or substantially liner. However, in other approaches, the path of the atomic particle or ion (and the subsequent etchant) through the polymer may take a tortuous path (e.g. a nonlinear path, a path that bends, etc.), thereby forming pores that extend through the polymer membrane in a tortuous fashion.

Yet another approach for forming a porous membrane may include etching a polymer membrane that includes two different phases. In such approaches, an etchant selective to one of the phases may be applied to dissolve that particular phase, thereby forming a pore. This approach may lend itself to producing pores that extend through the polymer membrane in a tortuous (e.g. nonlinear, bent, etc.) fashion. A polymer membrane with two different phases may include a block copolymer, according to some approaches.

It is important to note that the above methods for forming a porous membrane are illustrative. Of course, formation of the various components of the inventive systems disclosed herein, such as the porous membranes, may be achieved via any suitable method as would be recognized by one having skill in the art upon reading the present disclosure.

According to one embodiment, a polymer membrane may have and retain a desired functional group after the pores are formed (e.g., via neutron and/or ion tracking/etching) in the polymer membrane. For instance, in some approaches, a polymer membrane may have an intrinsic positive or negative surface charge, which may be due to functional groups that are intrinsic/native to the polymer membrane. As used herein in numerous approaches, an intrinsic/native functional group may refer to a functional group that is originally a part of (included within the chemical structure of the polymer membrane material) or coupled to a surface (including pores) of the polymer membrane and is not added via an additional functionalization process. In various approaches, the polymer membrane may retain the intrinsic functional groups that impart the desired surface charge after formation of the pores in the polymer membrane, such that the resulting porous polymer membrane may function as an anion or cation selective porous polymer membrane without further modification (e.g. without further addition of more strongly positive or negative functional groups). In other words, after formation of the pores in the polymer membrane, the resulting porous polymer membrane may thus retain the intrinsic positive or negative charge on the membrane surface and/or the inner pore surfaces.

In preferred approaches, suitable polymers may be selected based on their suitability as membranes used in water solutions. For instance suitable polymer membranes may exhibit limited swelling in water and avoid dissolution and/or degradation during extended use in solutions. Limited swelling of the polymer surface over particularly long time periods may be beneficial in reducing the pore diameter, which may increase the ionic selectivity by increasing the degree of double layer overlap.

In one particular embodiment, a polymer membrane may include and retain one or more intrinsic/native covalently and/or ionically bound functional groups that impart an intrinsic positive surface charge, such that after formation of pores in the polymer membrane (e.g. via neutron and/or ion tracking/etching), the resulting porous polymer membrane is selective for anions. The functional groups may be selected for retaining their charge in the water conditions used the intended treatment, including the pH.

In preferred approaches, the polymeric membrane material for selective anion transport may include polydiallyldimethylammonium chloride (polyDADmac). The molecular structure of polyDADmac is shown directly below:

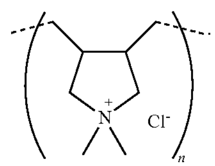

It is important to note that while the above molecular structure of polyDADmac illustrates the preferred pyrrolidine structure, polyDADmac may also be present in its piperidine structure. The polyDADmac polymeric membrane material may be cross-linked with trivinyl cyclohexane, ethyleneglycol diacrylate, or other suitable crosslinking agent, particularly divinyl benzene, as would be understood to one having ordinary skilled in the art upon reading the present disclosure.

In other approaches, the anion selective polymeric membrane material may include polyethyleneimne (PEI), the molecular structure of which is shown directly below:

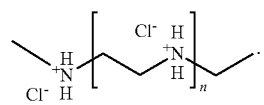

In yet more approaches, the anion selective polymeric membrane material may include 3-(Methacryloylamino)propyl trimethylammonium chloride, or similar structures in which the pendant amine is quaternized or otherwise positively charged. In further approaches, the anion selective polymeric membrane material may be selected from a group consisting of: polyDADmac, PEI, 3-(methacryloylamino)propyl trimethylammonium chloride, and a combination thereof.

In various approaches, the cationic selective polymeric material may include a biocide agent (e.g. a material that may deter, render harmless, or exert a controlling effect on any harmful organism by chemical or biological means). For instance, in one approach, the cation selective polymeric material may intrinsically include one or more ethylenediamine functional groups, or may be functionalized/modified to include one or more ethylenediamine functional groups, which may allow inclusion of strongly bound chelated copper ions as a biocide agent while still retaining ability to function as a cationic membrane.

Moreover, an anion selective polymeric material that includes at least one of polyDADmac, PEI, 3-(methacryloylamino)propyl trimethylammonium chloride, biguanidinium species, and other such related compounds as would be understood by one having skill in the art upon reading the present disclosure, may have a beneficial biocide effectiveness, which may be particularly advantageous in preventing biological fouling of the ion exchange membrane during extended use for desalination.

In another particular embodiment, a polymer membrane may include and retain one or more intrinsic/native functional groups that impart an intrinsic negative surface charge, such that after formation of pores in the polymer membrane (e.g. via neutron and/or ion tracking/etching), the resulting porous polymer membrane is selective for cations. In preferred approaches, the polymeric membrane material for selective cation transport may include polystyrene sulfonate. The molecular structure of polystyrene sulfonate is shown directly below:

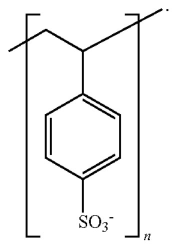

In other approaches, the cation selective polymeric membrane material may include a tetrafluoroethylene copolymer containing sulfonate groups. One example of sulfonated tetrafluoroethylene copolymer is Nafion® (Registered Trademark of Dupont), which is represented by:

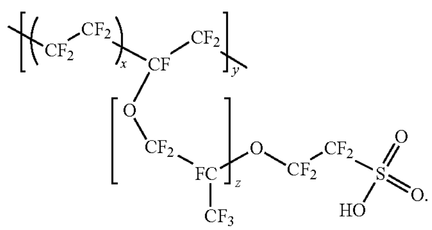

In more approaches, the cation selective polymeric material may include polyacrylate, which has carboxylic functional groups that provide negative sites for cation transport. In yet more approaches, the cation selective polymeric material may include a crown ether, including but not limited to a 12 membered crown ether, a 15 membered crown ether (e.g. 15-crown-5), a 18 membered crown ether (e.g. 18-crown-6, dibenzo-18-crown-6, etc.), a 21 membered crown ethers, diazacrown ether derivatives, etc. In additional approaches, the cation selective polymeric material may include one or more crown ethers that have affinities (e.g. binding selectivity) for specific cations. For instance, 15-crown-5 ethers may exhibit high affinities for sodium ions, while 18-crown-6 ethers may exhibit high affinities for potassium ions. In further approaches, the cation selective polymeric material may include one or more crown ethers and a copolymer having one or more $SO_3^-$ functional groups.

In still more approaches, the cation selective polymeric material may include at least one of: polycarbonate, alumina, polystyrene sulfonate, polyacrylate, a sulfonated tetrafluoroethylene copolymer, a crown ether, and/or combinations thereof.

In some preferred embodiments, a device comprises a porous membrane having a surface charge and pore configuration characterized by a double layer overlap effect being present in pores of the membrane. Another device may comprise a porous membrane having a surface charge (e.g. in one nonlimiting example, functional groups within a polymer structure) in pores thereof sufficient to impart anion or cation selectivity in the pores.

In some embodiments, the device may be included in a deionization system, which may further comprise a barrier, an anode coupled to the barrier, and a cathode coupled to the barrier. The device included in the deionization system may comprise a cation selective porous membrane and/or an anion selective porous membrane positioned between the anode and the cathode. The cation selective porous membrane, if present, may have a negative surface charge and pore configuration characterized by a double layer overlap effect being present in pores of the membrane. The anion selective porous membrane, if present, may have a positive surface charge and pore configuration characterized by a double layer overlap effect being present in pores of the membrane.

In some embodiments of the deionization system, both the cation selective porous membrane and the anion selective porous membrane may be present.

In one approach, an array of cation selective porous membranes may be present. In an alternative approach, or in combination with the foregoing, an array of anion selective porous membranes may be present.

In a further approach, the cation and/or anion selective porous membrane(s) may be ion specific, e.g., may be selective to specific cations or anions, such as calcium vs. sodium, nitrate vs. chloride, divalent vs. monovalent, etc. For example, in various approaches, the cation and/or anion selective membrane(s) may include intrinsic functional groups that impart ion specificity, and/or may be functionalized/modified to include functional groups that impart ion specificity. For example, a 15-crown-5 ether functional group may impart sodium ion selectivity; a 18-crown-6 ether may impart potassium ion selectivity; 18 and 21 membered diazacrown ether derivatives may impart calcium and magnesium selectivity, etc.

In some embodiments of the deionization system, the cation selective porous membrane may include a polyimide layer. In other embodiments, the anion selective porous membrane may have quaternary amines coupled thereto. The quaternary amines may be in titanate compounds, and may also be polymerized.

In some preferred embodiments, the membrane(s) in the device may be characterized as not requiring storage in a solution for maintaining an effectiveness thereof. For example, the membrane(s) may be stored in the air or in a package sealed against the air, and the effectiveness of the membrane(s) will not be affected by prolonged exposure to environments outside of any solution. This in particular would avoid requirements for storage in liquid solutions as is required in the case of many conventional membranes.

In some embodiments, a surface of the membrane(s), including the pore surfaces, disclosed herein may include functional groups that preferentially interact with either cations or anions and/or a specific cationic or anionic species. While such functional groups may be exposed to both cations and anions, these functional groups may have either a positive or negative charge which attracts anion or cations, respectively. For instance, a membrane that has functional groups with a positive charge coupled thereto may repel cations yet preferentially allow the transport of anions through the pores. Similarly, a membrane that has functional groups with a negative charge coupled thereto may repel anions yet preferentially allow the transport of cations through the pores. Moreover, as mentioned above, such functional groups may additionally be ion specific in further approaches. By way of example only, consider the case where a functional group specific/selective to sodium ions is coupled to a surface and/or the pores of a membrane. While this membrane having the sodium ion specific functional group coupled thereto may be exposed to a variety of cation and/or anion species in solution, this membrane will preferentially allow transport of sodium ions through the pores.

In one approach, the aforementioned functional groups that have a desired charge and/or interact with a specific ion species may be intrinsic to the membrane, meaning that such functional groups are originally a part of the polymer material composing the membrane (and are not added via an additional functionalization process). In another approach, the aforementioned functional groups may added to the membrane via a functionalization process. In yet another approach, a membrane(s) that already includes intrinsic functional groups that have a desired surface charge and/or interact with a specific ion species may also include additional functional groups that are added via membrane functionalization, where one, some or all of the added functional groups may have the same or different surface charge and/or interact with the same or different ion species as the intrinsic functional groups.

In various approaches, the above mentioned functional groups (e.g. intrinsic functional groups and functional groups added via membrane functionalization) may be coupled to any surface of the membrane(s), such as the outer surfaces of the membrane(s), the inner pore surfaces, etc. In some approaches, reactive compounds that provide anion functional groups may include 3 (trimethoxysilyl) propyldimethyl ammonium chloride for an anion functional group. Additional examples of functional groups that preferentially interact with anions include, but are not limited to, quaternary amines, titanate compounds including quaternary amines, secondary amines, tertiary amines, etc.

In other approaches, reactive compounds that provide cationic functional groups may include trimethoxysilyl propanoic acid and 3-[(3-(Trimethoxysilyl)propyl)thio]propane-1-oxy-sulfonic acid. Additional examples of functional groups that may preferentially interact with cations include, but are not limited to, sulfonate groups, carboxylic groups, crown ethers, etc.

In more approaches, the anhydride and epoxide compounds referenced earlier may include anionic or cationic functional groups. In yet more approaches, the functional groups disclosed herein may be included in compounds suitable to the pore containing polymer membrane of interest, as would be understood by one having skill in the art upon reading the present disclosure.

In a preferred approach, allyl compounds containing desired functional groups (including those listed above) may be incorporated into the polymer membrane by dissolving the desired allyl compound in a suitable hydrocarbon (or other suitable solvent as would be understood by one having skill in the art upon reading the present disclosure) that would swell but not fully dissolve or degrade the polymer membrane.

In some embodiments, the device may further comprise a polymer layer on a surface of the membrane for imparting the surface charge. In numerous approaches, this additional polymer layer may include any polymer disclosed herein as well as other suitable polymers as would be recognized by one having skill in the art upon reading the present disclosure. For instance, this additional polymer layer may include, but is not limited to, a polyimide, poly[N,N'-(phenoxyphenyl)-pyromellitimide](PMDA-ODA), polyDADmac, PEI, 3-(Methacryloylamino)propyl trimethylammonium chloride, polystyrene sulfonate, polyacrylate, etc. In more approaches, the additional polymer layer added to a surface of the membrane(s) may include functional groups that preferentially interact with cations or anions and/or are ion specific, where such functional groups may be intrinsic to the additional polymer layer and/or added via functionalization.

In various approaches, the polymer layer added to a surface of the membrane(s) may have a thickness in a range from a few angstroms to about 200 nm, preferably in a range from a few angstroms to 100 nm. In particular approaches, the thickness of the additional polymer layer may be selected based on the size of the pores in the underlying polymer membrane. For instance, in approaches where the polymer membrane has large pores, the presence of a thicker additional polymer layer may reduce the overall effective pore size to a range where double layer overlap is appropriate to the ionic strength of the solution. Comparison of Experiments X-XIII, and particularly Table 3, provide insight as to the effect of pore size in nanoporous membranes pores. Specifically, Experiments X-XI illustrate that smaller pore sizes (e.g. about 10 nm or less) may have a greater-better double layer overlap and thus a greater ion selectivity as compared to larger pore sizes (e.g. about 30 nm or larger). Accordingly, porous membranes with pore sizes of about 30 nm or greater may not have a desired cation or anion selectivity in a particular solution unless modified to include functional groups that preferentially interact with cations or anions and/or an additional polymer layer. Moreover, in other approaches, an acceptable or desired pore size (e.g. a pore size that exhibits a sufficient double layer effect to confer improved cation or anion selectivity) may be determined relative to the solution in which the membrane is immersed. For example, FIG. 6 provides an illustration of the relationship between double layer thickness (e.g. the thickness of the zone/pore containing the counter ions) versus ionic strength of a solution.

In yet more approaches approaches, the additional polymer layer may be a continuous polymer layer coating the majority of the outer surfaces and/or inner pore surfaces of the polymer membrane to which it is applied. In preferred approaches, the additional polymer layer may be a continuous polymer layer coating substantially all or the entirety of the outer surfaces and/or inner pores of the polymer membrane.

In additional approaches, two or more compounds (such as those described herein) containing functional groups having a desired surface charge and/or ion specificity may be added to a surface and/or pores of the membrane(s) where the combined presence of the functional groups are desired to facilitate transport of a particular ion(s).

In some embodiments, a method for separating ions from a fluid may comprise setting a potential of an anode and a cathode and contacting a fluid with at least one of a cation selective porous membrane and an anion selective porous membrane positioned between the anode and the cathode. In some embodiments, the cation selective porous membrane, if present, may have a negative surface charge and pore configuration characterized by permitting cations to pass through the pores thereof. In addition, in some embodiments, the anion selective porous membrane, if present, may have a positive surface charge and pore configuration characterized by permitting anions to pass through the pores thereof.

In further approaches, a surface of the cation selective membrane and/or the anion selective membrane may include functional groups that preferentially interact with cations and/or anions, respectively. In more approaches, a surface of the cation selective membrane and/or the anion selective membrane may include a polymer layer for imparting the surface charge. In approaches where a polymer layer is coupled to a surface of the cation selective membrane, functional groups that preferentially interact with cations may be coupled directly to a surface of the polymer membrane. In approaches where a polymer layer is coupled to a surface of the anion selective membrane, functional groups that preferentially interact with anions may be coupled directly to a surface of the polymer membrane.

In preferred embodiments of the method, both the cation selective porous membrane and the anion selective porous membrane may be present.

In other approaches, conventional ED membranes may be used in conjunction with the cation and/or anion selective membranes disclosed herein.

Experiments

Figure 1:
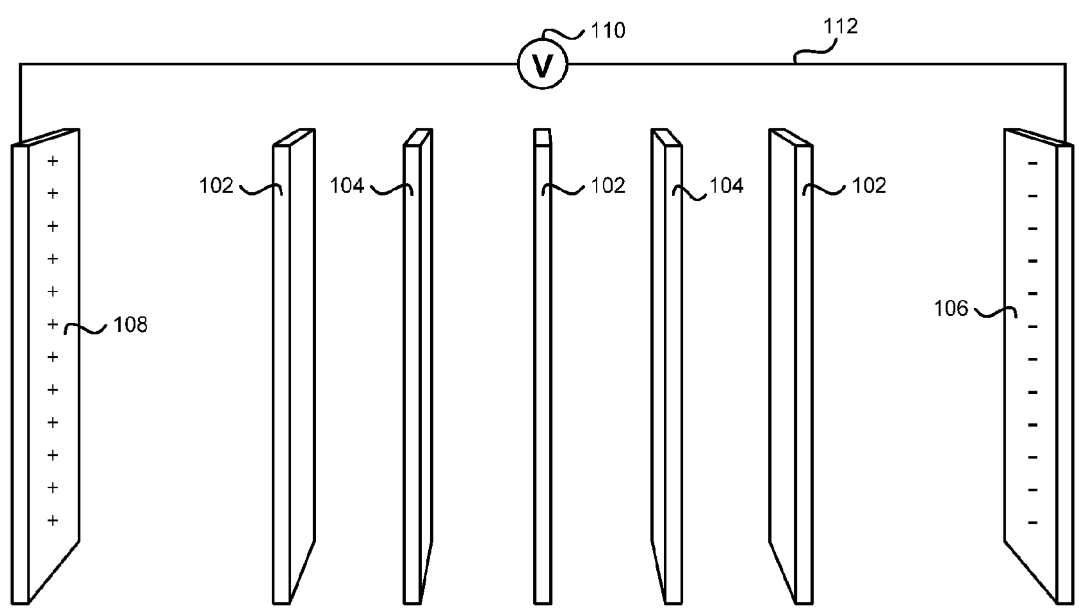
FIG. 1 shows a schematic of the standard electrodialysis (ED) process.
Figure 2:
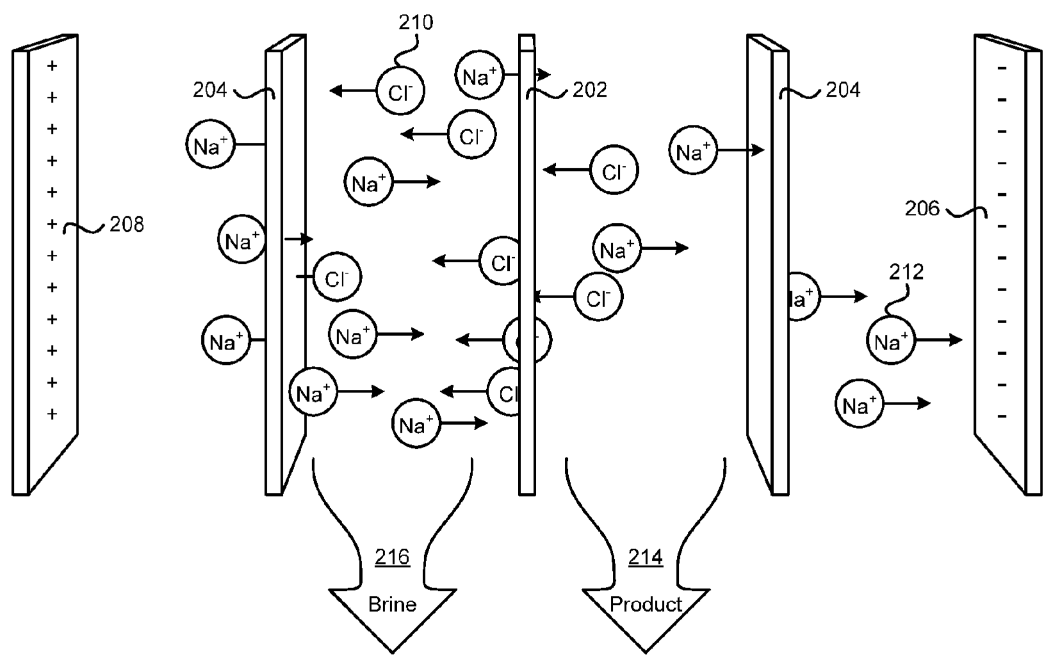
FIG. 2 is a schematic of a working ED process.
Figure 3:
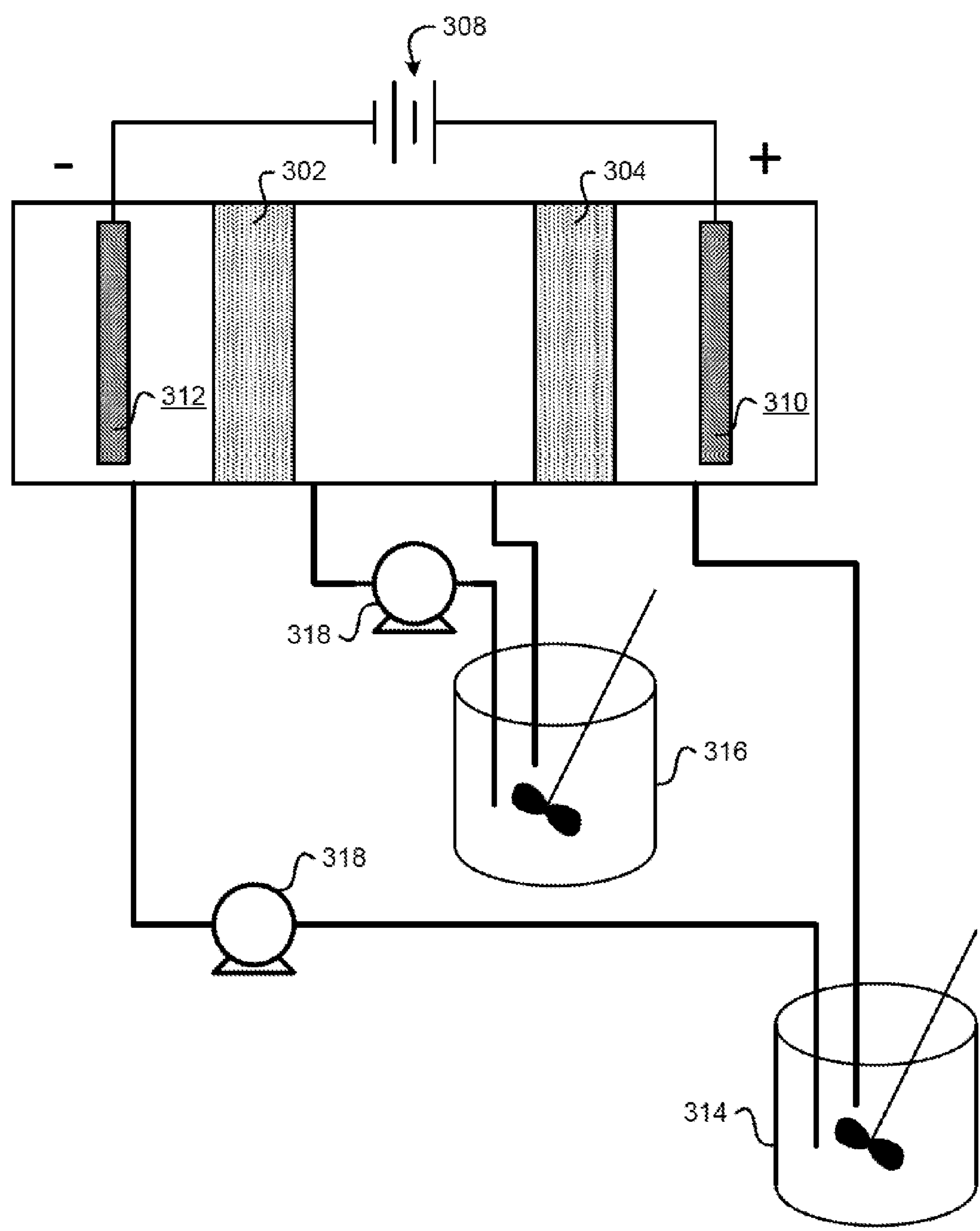
FIG. 3 is a schematic of a system for testing methods of deionizing water according to one embodiment.

The system shown in FIG. 3 was used to evaluate the performance of different membranes. The applied voltage, from voltage source 308, remained constant, while the resulting current was measured as a function of time. A cathode 312 and an anode 310 were placed on either side of membranes 302 and 304, which may be the same or different types of membranes. In the typical electrodialysis operation membrane 302 would be the cation membrane and membrane 304 would be the anion membrane. A microprocessor was used to measure the pH, conductivity, and temperature for both the MID chamber 316 and the CATION/ANION chamber 314 as a function of time. Pumps 318 were used to transport the solution into the MID chamber 316 and the CATION/ANION chamber 314. Ion selective electrodes (ISEs) were used to monitor the transport of specific ions. One of the major ions of interest was the nitrate ion, therefore nitrate ISEs were placed in both the MID and CATION/ANION chambers. The plethora of possible embodiments of this invention are not to be limited to the specific examples given below but rather these experiments illustrate exemplary elements of the invention.

Initial conductivities and nitrate levels for both the MID and CATION/ANION chambers were measured. The voltage was applied in a fashion in order to move nitrate ions from the MID chamber to the CATION/ANION chamber. Conductivity and nitrate ion levels were then monitored as a function of time. Evidence of the performance of the membranes was an increase in conductivity and nitrate levels in the CATION/ANION chamber and a decrease in conductivity and nitrate levels in the MID chamber. The rate of change of conductivity (slope of the conductivity as a function of time) or the rate of change of the nitrate level (slope of nitrate level as a function of time) for a given applied voltage provides a measure of the relative performance of different membranes. The larger the reduction in the rate of change of the conductivity or the rate of change of the nitrate level as a function of time for a given voltage, the less energy is used to remove the specific contaminant.

Experiment I

Standard commercial cation and anion membranes manufactured by Ionics Corporation were placed into the apparatus shown in FIG. 3. In this experiment membrane 302 was the cation membrane and membrane 304 was the anion membrane.

Both the MID and CATION/ANION chambers were filled with a solution of approximately 1000 ppm of $NaNO_3$ in deionized water. A constant voltage of 8 volts was applied. The rate of change of the conductivity of the MID chamber was −143 μSiemens/cm-hr. The rate of change of the nitrate level of the MID chamber was −92 ppm/hr.

Experiment II

The Standard commercial cation and anion membranes from Experiment I were reversed from the configuration shown in FIG. 3, i.e., the cation membrane was placed in the location where the anion membrane is shown in FIG. 3. This resulted in the anion membrane being in front of the negative platinum electrode and the cation membrane in front of the positive platinum electrode. This configuration should not facilitate the transport of ions. It measures the selectivity of the membranes or their ability to act as a "diode." Both the MID and CATION/ANION chambers were filled with a solution of approximately 1000 ppm of $NaNO_3$ in deionized water. A constant voltage of 8 volts was applied. The rate of change of the conductivity of the MID chamber was −5 μSiemens/cm-hr (within the drift of the instrument). There was no detectable change of the nitrate level of the MID chamber. This demonstrated that the commercial membranes are highly selective and exhibit a strong "diode effect."

Experiment III

The commercial membranes from Experiments I and II were placed into the apparatus shown in FIG. 3, using the same arrangement of anion and cation membranes as in Experiment I. Both the MID and CATION/ANION chambers were filled with a solution of approximately 1000 ppm of $NaNO_3$ in deionized water. A constant voltage of 4 volts was applied. The rate of change of the conductivity of the MID chamber was −34 μSiemens/cm-hr. The rate of change of the nitrate level of the MID chamber was −12 ppm/hr.

Experiment IV

To test cation selective FIC membranes, the commercial Anion membrane from Experiments I and II was placed into the apparatus shown in FIG. 3. The cation membrane used for this test was an FIC membrane. The FIC membrane was produced using a Solventless Vapor Deposition method followed by an In Situ Polymerization (SLIP) process, as would be known by one of skill in the relevant art. The polymer coating was formed by depositing and reacting pyromellitic dianhydride (PMDA) and diamine oxydianiline (ODA). The final polyimide produced from the reaction of this dianhydride and diamine is poly[N,N'-(phenoxyphenyl)-pyromellitimide](i.e., PMDA-ODA). The result was a 100 nm thick polyimide film onto a PORETICS® 10 nm (10 nm pore diameter) polycarbonate membrane. Both the MID and CATION/ANION chambers were filled with a solution of approximately 1000 ppm of $NaNO_3$ in deionized water. A constant voltage of 8 volts was applied. The rate of change of the conductivity of the MID chamber was −170 μSiemens/cm-hr. The rate of change of the nitrate level of the MID chamber was −168 ppm/hr.

Experiment V

Figure 4:
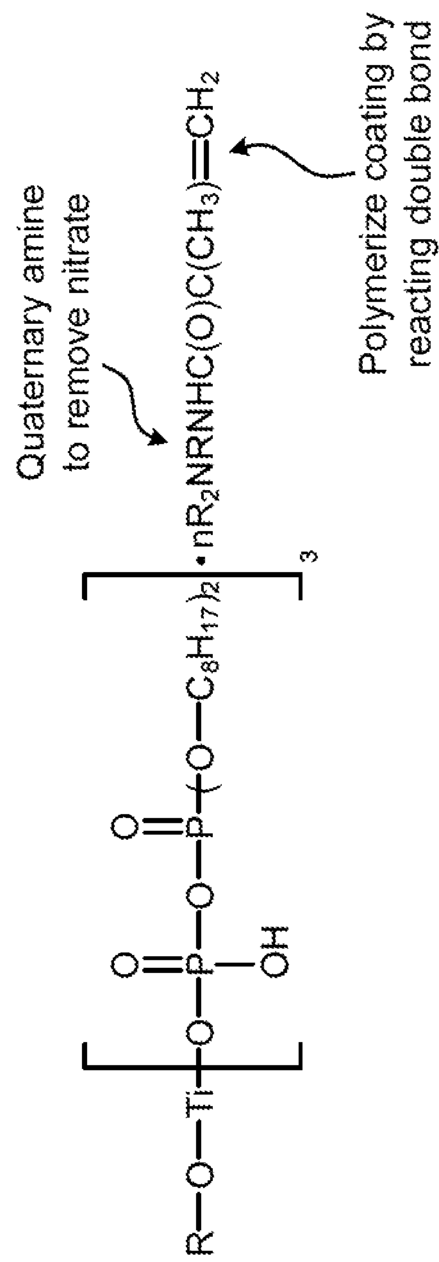
FIG. 4 is the chemical structure of LICA 38J.

To test anion selective FIC membranes, the commercial cation membrane from Experiments I and II was placed into the apparatus shown in FIG. 3. The anion membrane used for this test was an FIC membrane. The FIC membrane was produced by casting a 0.1% aqueous solution of LICA 38J (supplied by KENRICH PETROCHEMICAL, INC.) onto a PORETICS® 10 nm (10 nm pore diameter) polycarbonate membrane. The chemical structure of LICA 38J is shown in FIG. 4. The sample was air dried over night, then placed under an Ultraviolet (UV) lamp in the presence of a nitrogen atmosphere for about 10 minutes. Both the MID and CATION/ANION chambers were filled with a solution of approximately 1000 ppm of $NaNO_3$ in deionized water. A constant voltage of 8 volts was applied. The rate of change of the conductivity of the MID chamber was −186 μSiemens/cm-hr. The rate of change of the nitrate level of the MID chamber was −129 ppm/hr.

The quaternary amine structure of the LICA 38J enables the material to perform well as an anion selective membrane. The LICA 38J is polymerized through the double bond on exposure to UV radiation under a nitrogen atmosphere. Polymerization of the film imparts additional stability to the film.

Experiment VI

To test anion selective FIC membranes, the commercial cation membrane from Experiments I and II was placed into the apparatus shown in FIG. 3. The anion membrane used for this test was the FIC membrane from Experiment V. Both the MID and CATION/ANION chambers were filled with a solution of approximately 1000 ppm of $NaNO_3$ in deionized water. A constant voltage of 4 volts was applied. The rate of change of the conductivity of the MID chamber was −69 μSiemens/cm-hr. The rate of change of the nitrate level of the MID chamber was −62 ppm/hr.

Experiment VII

To test cation and anion FIC membranes, the FIC cation membrane from Experiment IV and the FIC anion membrane from Experiment V were placed into the apparatus shown in FIG. 3. Both the MID and CATION/ANION chambers were filled with a solution of approximately 1000 ppm of $NaNO_3$ in deionized water. A constant voltage of 8 volts was applied. The rate of change of the conductivity of the MID chamber was −133 μSiemens/cm-hr. The rate of change of the nitrate level of the MID chamber was −94 ppm/hr.

Experiment VIII

To test cation and anion FIC membranes, the FIC membranes from Experiment VII were placed into the apparatus shown in FIG. 3. Both the MID and CATION/ANION chambers were filled with a solution of approximately 1000 ppm of $NaNO_3$ in deionized water. A constant voltage of 4 volts was applied. The rate of change of the conductivity of the MID chamber was −56 μSiemens/cm-hr. The rate of change of the nitrate level of the MID chamber was −37 ppm/hr.

Experiment IX

To calculate the energy requirements of the FIC membranes versus the energy requirements of commercial membranes, the FIC membrane and commercial anion membrane from Experiment IV were reversed in their configurations as described in Experiment II. This tests the selectivity of the membrane pair or the "diode effect," as previously mentioned. Both the MID and CATION/ANION chambers were filled with a solution of approximately 1000 ppm of $NaNO_3$ in deionized water. A constant voltage of 8 volts was applied. There was no detectable rate of change of the conductivity of the MID chamber and no detectable change of the nitrate level of the MID chamber. This demonstrated that FIC membranes are highly selective and exhibit a strong "diode effect."

Figure 5:
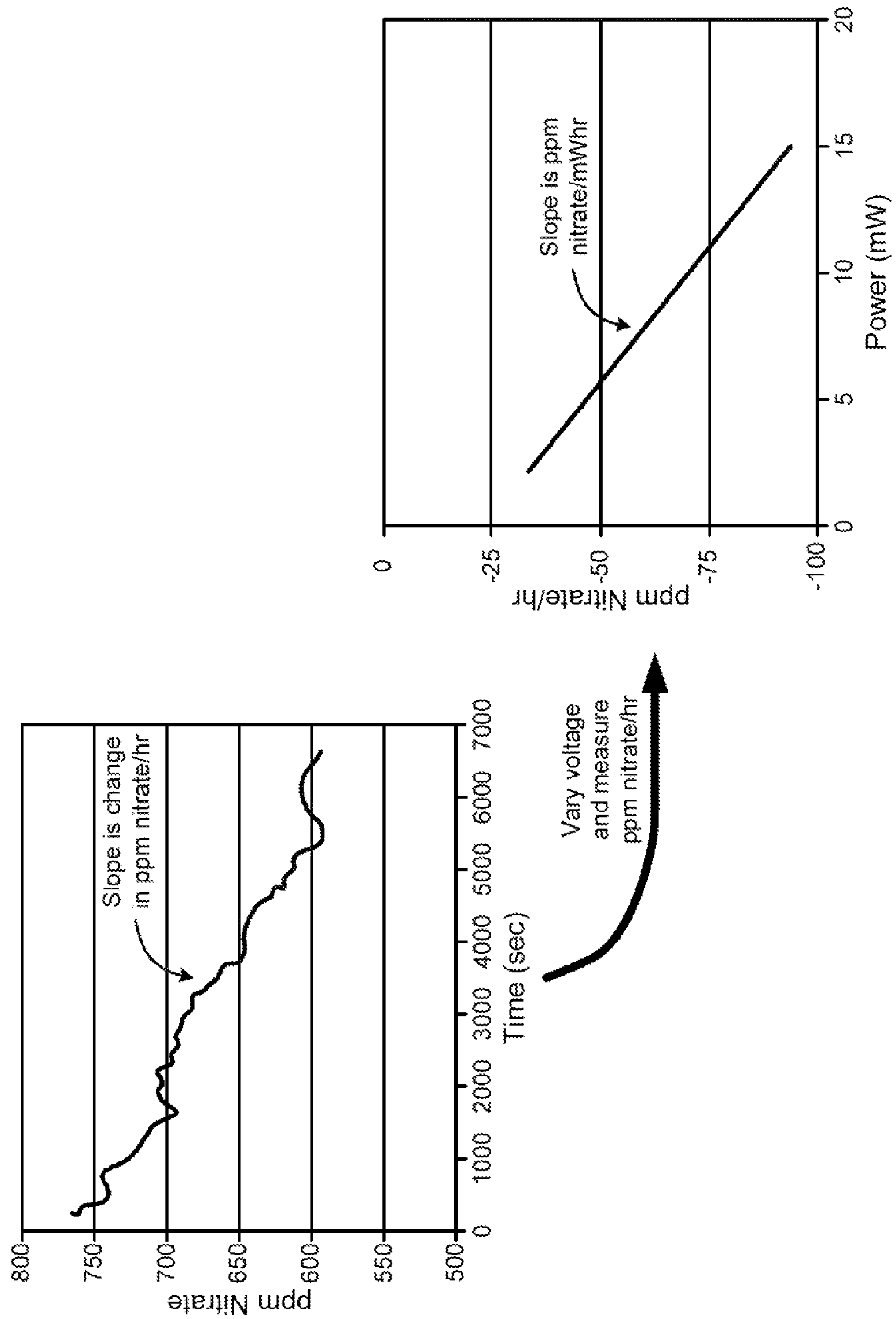
FIG. 5 shows a series of graphs which show how to make a nitrate/mWhr calculation.

The power, in mW, needed to remove the nitrate ions from the MID chamber can be calculated by multiplying the voltage (V) applied by the measured current (mA). The rate of change of the nitrate levels in the MID chamber (ppm Nitrate/hr) can then be plotted against the power required to perform the separation. The slope of the plot of ppm Nitrate/hr. vs. mW curve is a measure of the ppm Nitrate/mWhr. The procedure to perform this calculation is outlined in FIG. 5. This is a measure of the amount of change of ppm Nitrate per mWhr or the amount of nitrate removed per unit of energy. The larger this value, the less energy is needed to remove nitrate, i.e., the membrane is more energy efficient.

Table 1 shows a comparison of energy requirements per weight for FIC membranes as compared to commercial counterparts by comparing the results from Experiments I and III for the two commercial membranes and Experiments VII and VIII for the FIC membranes. The FIC membrane pair exhibits a greater ppm Nitrate per mWhr (22% greater), and therefore removes more nitrate ions from the MID chamber per unit of energy than the commercial membranes. In addition, the FIC membranes weigh less than their commercial counterparts. As a result, the FIC membranes remove more nitrate ions from the MID chamber per unit of energy per weight of material (nearly 100 times greater) than their commercial counterparts, resulting in vastly greater performance and efficiency.

TABLE 1

| Experiment | Cation Membrane | Anion Membrane | ppm Nitrate/ mWhr | Total Weight (gm) | ppm Nitrate/ mWhr-gm |
|---|---|---|---|---|---|
| I & III | Commercial | Commercial | 4.6 | 0.68 | 6.8 |
| VII & VIII | FIC | FIC | 5.6 | 0.0084 | 666 |

Table 2, a comparison of energy requirements per volume for FIC membranes as compared to their commercial counterparts compares the same results from Experiments I, III, VII, and VIII, but compares them on a volume basis. The FIC membranes remove more nitrate ions from the MID chamber per unit of energy per volume of material (over 200 times greater) than their commercial counterparts.

TABLE 2

| Experiment | Cation Membrane | Anion Membrane | ppm Nitrate/ mWhr | Total Weight (gm) | ppm Nitrate/ mWhr-gm |
|---|---|---|---|---|---|
| I & III | Commercial | Commercial | 4.6 | 0.16 | 29 |
| VII & VIII | FIC | FIC | 5.6 | 0.00094 | 5942 |

The charge on the surface of the membrane is also important for FIC membranes. The double layer effect is demonstrated in FIG. 6. As shown in the membranes 602, 604 of FIG. 6, the negatively charged pore surface in each membrane 602, 604 attracts a layer of positive ions from the solution, thus forming a double layer 606 of charges, e.g., a negative charge in the pore wall and a positive charge in particles attracted thereto. Double layer overlap occurs when the pore size is decreased enough that the double layer from the top side of the pore overlaps the double layer from the bottom side of the pore. This can be seen by comparing the partial view of membrane 602, which does not exhibit double layer overlap, with the partial view of membrane 604, which does exhibit double layer overlap. This double layer overlap imparts selectivity to the membrane. For example, in this case only cations will be transported through the pore. If double layer overlap does not occur, the membrane may lose its selectivity. As shown in FIG. 6, this could mean that it would pass anions as well as cations. It is predicted that membranes need to have pore diameters less than approximately 16 nm in order for double layer overlap to occur when the feed water is brackish water (total dissolved solids of approximately 1,000 or less). Double layer overlap may not occur for pores greater than 16 nm for the nominal range of brackish water (larger pores might work in very dilute water solutions).

Experiment X

To demonstrate the effect of pore size in nanoporous membranes, the commercial anion membrane described in Experiment I was placed into the apparatus shown in FIG. 3. A PORETICS® 10 nm (10 nm pore diameter) membrane was used as the cation membrane and placed in the apparatus in FIG. 3. Both the MID and CATION/ANION chambers were filled with a solution of approximately 1000 ppm of $NaNO_3$ in deionized water. A constant voltage of 8 volts was applied. The rate of change of the conductivity of the MID chamber was −60 μSiemens/cm-hr.

Experiment XI

To demonstrate the effect of pore size in nanoporous membranes, the commercial cation membrane from Experiment I was placed in the apparatus in FIG. 3. The PORETICS® 10 nm membrane from Experiment X was used as the anion membrane for this experiment. Both the MID and CATION/ANION chambers were filled with a solution of approximately 1000 ppm of $NaNO_3$ in deionized water. A constant voltage of 8 volts was applied. The rate of change of the conductivity of the MID chamber was −17 μSiemens/cm-hr. This change in conductivity was within the drift of the conductivity meter. This demonstrated that the sample with 10 nm pores preferentially enabled the transport of cations over anions.

Experiment XII

To demonstrate the effect of pore size in nanoporous membranes, the commercial anion membrane described in Experiment I was placed into the apparatus shown in FIG. 3. A PORETICS® 30 nm membrane was used as the cation membrane and placed in the apparatus in FIG. 3. Both the MID and CATION/ANION chambers were filled with a solution of approximately 1000 ppm of $NaNO_3$ in deionized water. A constant voltage of 8 volts was applied. The rate of change of the conductivity of the MID chamber was −84 μSiemens/cm-hr.

Experiment XIII

To demonstrate the effect of pore size in nanoporous membranes, the commercial cation membrane from Experiment I was placed in the apparatus in FIG. 3. The PORETICS® 30 am membrane from Experiment XII was used as the anion membrane for this experiment. Both the MID and CATION/ANION chambers were filled with a solution of approximately 1000 ppm of $NaNO_3$ in deionized water. A constant voltage of 8 volts was applied. The rate of change of the conductivity of the MID chamber was −69 μSiemens/cm-hr. This demonstrated that the sample with 30 nm pores transported both cations and anions and had much poorer selectivity than the 10 nm sample. Table 3 summarizes the results from Experiments X through XIII.

TABLE 3

| Experiment | Cation Membrane | Anion Membrane | Change in Conductivity of MID Chamber (μSiemens/cm-hr) |
|---|---|---|---|
| X | PORETICS ® 10 nm | Commercial Anion | −60 |
| XI | Commercial Cation | PORETICS ® 10 nm | −17 |
| XII | PORETICS ® 30 nm | Commercial Anion | −84 |
| XIII | Commercial Cation | PORETICS ® 30 nm | −69 |

Experiment XIV

To demonstrate the effect of pore density on nanoporous membranes, the commercial anion membrane described in Experiment I was placed into the apparatus shown in FIG. 3. An ion track etched membrane supplied by IT4IP with 15 nm pores and a pore density of $1\times10^9$ pores/$cm^2$ was used as the cation membrane and placed in the apparatus in FIG. 3. Both the MID and CATION/ANION chambers were filled with a solution of approximately 1000 ppm of $NaNO_3$ in deionized water. A constant voltage of 8 volts was applied. The rate of change of the conductivity of the MID chamber was −83 μSiemens/cm-hr.

Experiment XV

To demonstrate the effect of pore density on nanoporous membranes, the commercial anion membrane described in Experiment I was placed into the apparatus shown in FIG. 3. An ion track etched membrane supplied by IT4IP with 15 nm pores and a pore density of $4\times10^9$ pores/$cm^2$ was used as the cation membrane and placed in the apparatus in FIG. 3. Both the MID and CATION/ANION chambers were filled with a solution of approximately 1000 ppm of $NaNO_3$ in deionized water. A constant voltage of 8 volts was applied. The rate of change of the conductivity of the MID chamber was −106 μSiemens/cm-hr. This is a 27% increase in the rate of change in conductivity over the sample tested in Experiment XIV.

Experiment XVI

To demonstrate the effect of pore density on nanoporous membranes, the commercial cation membrane described in Experiment I was placed into the apparatus shown in FIG. 3. The membrane with a pore density of $4\times10^9$ pores/$cm^2$ described in Experiment XV was used as the anion membrane and placed in the apparatus in FIG. 3. Both the MID and CATION/ANION chambers were filled with a solution of approximately 1000 ppm of $NaNO_3$ in deionized water. A constant voltage of 8 volts was applied. There was no detectable rate of change of the conductivity of the MID chamber. This demonstrated that if the pore size is in the proper range, increasing pore density can increase the transport of ions without a loss in selectivity (i.e., without a loss in "diode effect"). Table 4 summarizes the results from Experiments XIV through XVI.

TABLE 4

| Experiment | Cation Membrane | Anion Membrane | Pore Density (pores/$cm^2$) | Change in Conductivity of MID Chamber (μSiemens/cm-hr) |
|---|---|---|---|---|
| XIV | It4ip 15 nm | Commercial Anion | $1\times10^9$ | −83 |
| XV | It4ip 15 nm | Commercial Anion | $4\times10^9$ | −106 |
| XVI | Commercial Cation | It4ip 15 nm | $4\times10^9$ | Non Detected |

The results in the preceding experiments demonstrate that when designing FIC membranes for deionizing water, the following considerations are preferred:

1. Surface Charge: The inherent surface charge of the cation selective membrane is negative, while the surface charge of the anion selective membrane is positive.
2. Pore Size: Less than about 30 nm, preferentially between about 6 nm and about 16 nm.
3. Pore Density: Based on pore size above, preferential pore density equal to or greater than about $1\times10^9$ pores/$cm^2$. Increasing pore density increases performance.
4. Functional Groups: Nanolayers of materials preferred on the surface to prevent clogging of pores. The deposition of polyimides using the SLIP process is promising since the polyimide imparts a negative charge to the surface and when deposited using SLIP does not clog the pores. Titanate compounds that combine quaternary amines bind to the surface of the ion track-etched polycarbonate and are anion selective. The presence of double bonds in the compound enables the film to be polymerized for added stability. Other materials can similarly be added to the surfaces (pores) of the membranes along with other approaches such as incorporation of functional groups to similarly improve the membrane performance.

In Use

Uses for the various embodiments of the present invention are numerous, and not limited by the teachings herein. Illustrative uses include water purification, materials separation in aqueous and nonaqueous streams, site remediation, biological and medical applications, etc. Illustrative water purification applications include purifying water for potable water, semiconductor processing, industrial water applications, (e.g., purifying water for industrial boilers), etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A deionization system, comprising:

an anode;

a cathode;

at least one cation selective porous membrane in a solution, the at least one cation selective porous membrane being positioned between the anode and cathode; and at least one anion selective porous membrane in a solution, the at least one anion selective porous membrane being positioned between the anode and the cathode, wherein the at least one cation selective porous membrane has a negative surface charge and pore configuration characterized by a double layer overlap effect being present in pores of the at least one cation selective porous membrane, wherein the at least one anion selective porous membrane has a positive surface charge and pore configuration characterized by a double layer overlap effect being present in pores of the at least one anion selective porous membrane, wherein the at least one anion selective porous membrane is coupled to a polymer layer configured to impart a positive surface charge, wherein the polymer layer comprises functional groups that preferentially interact with anions, the functional groups being coupled directly to a surface of the polymer layer, wherein at least one of the functional groups coupled directly to a surface of the polymer layer include 3-(trimethoxysilyl) propyldimethyl ammonium chloride.

2. The deionization system as recited in claim 1, wherein the polymer layer comprises a biocide agent.

3. The deionization system as recited in claim 2, wherein the biocide agent comprises at least one chelated copper ion.

4. The deionization system as recited in claim 1, the at least one cation selective porous membrane comprising functional groups that preferentially interact with cations, the functional groups being coupled directly to a surface of the at least one cation selective porous membrane.

5. The deionization system as recited in claim 1, wherein the at least one cation selective porous membrane comprises a material selected from the group consisting of: a crown ether, sulfonated tetrafluroethylene, polyacrylate, poly [N,N'-(phenoxyphenyl)-pyromellitimide], and combinations thereof.

6. The deionization system as recited in claim 1, comprising a second polymer layer, wherein the at least one cation selective porous membrane is coupled to the second polymer layer.

7. The deionization system as recited in claim 6, wherein the second polymer layer comprises functional groups that preferentially interact with cations, the functional groups being coupled directly to a surface of the second polymer layer.

8. The deionization system as recited in claim 6, wherein at least one of the polymer layer and the second polymer layer include a biocide agent.

9. The deionization system as recited in claim 6, wherein at least one other of the functional groups coupled directly to a surface of the polymer layer is selected from the group consisting of: ethylenediamine, trimethoxysilyl propanoic acid, and 3-[(3-(trimethoxysilyl)propyl)thio]propane-1-oxy-sulfonic acid.

10. The deionization system as recited in claim 1, wherein the at least one cation selective porous membrane is ion specific.

11. The deionization system as recited in claim 10, wherein the at least one cation selective porous membrane is specific to at least one cation selected from the group consisting of: potassium, magnesium, and calcium.

12. The deionization system as recited in claim 1, wherein the at least one anion selective porous membrane is ion specific.

13. The deionization system as recited in claim 1, wherein the at least one anion selective porous membrane is specific to at least one of chloride and nitrate.

14. The deionization system as recited in claim 1, comprising an array of the at least one cation selective porous membranes, wherein each cation selective membrane in the array is positioned between the anode and cathode and has a negative surface charge and pore configuration characterized by a double layer overlap effect being present in pores of the cation selective porous membranes.

15. The deionization system as recited in claim 1, comprising an array of the at least one anion selective porous membranes, wherein each anion selective membrane in the array is positioned between the anode and cathode and has a positive surface charge and pore configuration characterized by a double layer overlap effect being present in pores of the anion selective porous membrane.

16. The deionization system as recited in claim 1, wherein the at least one anion selective porous membrane comprises a material selected from the group consisting of: biguanidinium, 3-(methacryloylamino)propyl trimethylammonium chloride, and combinations thereof.

* * * * *